US007484754B2

(12) United States Patent
Yamachi et al.

(10) Patent No.: US 7,484,754 B2
(45) Date of Patent: Feb. 3, 2009

(54) STEERING WHEEL EQUIPPED WITH AIRBAG DEVICE

(75) Inventors: Ippei Yamachi, Hiroshima (JP); Ryoji Funahashi, Hiroshima (JP); Naoki Kaneko, Hiroshima (JP); Masanobu Fukushima, Hiroshima (JP); Yasunori Sasaki, Hiroshima (JP); Akihiro Kobayashi, Hiroshima (JP)

(73) Assignee: Mazda Motor Corporation (JP)

( * ) Notice: Subject to any disclaimer, the term of this patent is extended or adjusted under 35 U.S.C. 154(b) by 122 days.

(21) Appl. No.: 11/488,732

(22) Filed: Jul. 19, 2006

(65) Prior Publication Data

US 2007/0024035 A1    Feb. 1, 2007

(30) Foreign Application Priority Data

Jul. 27, 2005   (JP)   ............................. 2005-217673
Jul. 27, 2005   (JP)   ............................. 2005-217705
Aug. 3, 2005   (JP)   ............................. 2005-225169
Aug. 3, 2005   (JP)   ............................. 2005-225329

(51) Int. Cl.
   *B60R 21/16* (2006.01)
(52) U.S. Cl. ........................................ 280/731
(58) Field of Classification Search ............... 280/728.3, 280/731; 74/552
   See application file for complete search history.

(56) References Cited

U.S. PATENT DOCUMENTS 4,663,210 A * 5/1987 Schreiber et al. ............ 428/160

5,184,845 A * 2/1993 Omura ......................... 280/735
5,244,230 A * 9/1993 Komiya et al. ............... 280/777
5,871,231 A * 2/1999 Richards et al. ............. 280/735
6,422,602 B1 * 7/2002 Ishii et al. .................. 280/743.1
6,739,620 B2 * 5/2004 Derrick ........................ 280/731
7,036,865 B2 * 5/2006 Sato et al. ..................... 296/70
2005/0146119 A1   7/2005 Ford et al.

FOREIGN PATENT DOCUMENTS

DE   19749914   5/1999
JP   2004-224145   8/2004
WO   WO 03/062023   7/2003

OTHER PUBLICATIONS

European Search Report Opinion, EP 06014414, Feb. 6, 2007.
European Search Report, EP 06014414, Oct. 25, 2006.

* cited by examiner

*Primary Examiner*—John Q. Nguyen
*Assistant Examiner*—Robert A. Coker
(74) *Attorney, Agent, or Firm*—Studebaker & Brackett PC; Donald R. Studebaker

(57) ABSTRACT

A ring portion of a steering wheel is disposed to be inclined relative to a vertical direction with an inclined angle between 40 and 90 degrees, when viewed from a vehicle width direction, and a bag portion has a larger configuration than the ring portion so as to cover over the ring portion when an airbag inflation is completed. Accordingly, there can be provided the steering wheel equipped with the so-called donut type of airbag portion of a airbag device that can perform its advantages fully and thereby improve the driver's protection.

12 Claims, 10 Drawing Sheets

STEERING WHEEL EQUIPPED WITH AIRBAG DEVICE

BACKGROUND OF THE INVENTION

The present invention relates to a steering wheel equipped with an airbag device, which comprises a ring portion, a pad portion and the airbag device disposed in the pad portion.

Conventionally, a steering wheel comprising a ring portion to be griped by a driver, a pad portion coupled to the ring portion via a spoke portion and located at a central portion of the ring portion, and an airbag device disposed in the pad portion is known. In the conventional steering wheel, there are provided tear grooves having a V-shaped cross section, which are formed, for example, in a H shape, at a center of a cover member of the pad portion. Herein, when a bag portion of the airbag device is inflated, the above-described tear grooves of the cover member are torn off and an opening portion is formed. The bag portion comes out of the opening portion and is fully inflated.

Also, as disclosed in Japanese Patent Application Laid-Open No. 2004-224145, the airbag device comprising the bag portion (so-called donut type of airbag) that is accommodated in the pad portion substantially in a ring shape, when viewed from a driver's head, and operative to inflate substantially in a ring shape toward the driver' head at a vehicle frontal crash. Herein, part of the cover member of the pad portion that corresponds to a central portion of the bag portion does not open and a peripheral portion of that opens so as to form the opening portion substantially in a ring shape for the bag portion inflating. And, inside the part of the cover member that does not open (generally, at the center of the pad portion) is provided an accessory such as a hone or an emblem.

Herein, the above-described conventional airbag device equipped with the above-described donut type of airbag has not performed its advantages fully yet, so there is some room to make improvements from a driver's protection point of view.

SUMMARY OF THE INVENTION

The present invention has been devised in view of the above-described matter, and an object of the present invention is to provide a steering wheel equipped with a so-called donut type of airbag portion that can perform its advantages fully and thereby improve the driver's protection properly.

Namely, according to the present invention, there is provided a steering wheel equipped with an airbag device, comprising a ring portion to be griped by a driver, a pad portion coupled to the ring portion via a spoke portion and located at a central portion of the ring portion, and an airbag device disposed in the pad portion, wherein the airbag device comprises a bag portion that is accommodated in the pad portion substantially in a ring shape, when viewed from the driver, and operative to inflate toward a driver's head at a vehicle frontal crash, part of the pad portion located on a side of the driver includes a cover member that comprises a fixed cover portion that is located at a central portion of the bag portion and does not open at inflation of the bag portion and an open cover portion that is disposed around the fixed cover portion and opens outside so as to form a substantially-ring-shaped opening portion through which the bag portion inflates toward the driver's head at the inflation of the bag portion, the ring portion is disposed to be inclined relative to a vertical direction with an inclined angle between 40 and 90 degrees, when viewed from a vehicle width direction, and the bag portion has a larger configuration than the ring portion so as to cover over the ring portion when the inflation is completed.

Generally, in the case where the ring portion of the steering wheel is disposed to be inclined relative to the vertical direction with the inclined angle between 40 and 90 degrees, when viewed from the vehicle width direction, there is a concern that at the vehicle frontal crash the steering wheel would be pushed upward by a steering shaft and move toward the driver's head, so that a driver's chest portion would hit against the rear-side part of the ring portion of the steering wheel before the driver's face hits against the top end of the inflated bag portion. Herein, according to the present invention, since the bag portion has the larger configuration than the ring portion, the driver's chest portion can surely hits against a rear-side part of an outer peripheral portion of the pad portion before hitting against the ring portion. Accordingly, an impact to the driver's chest portion can be reduced properly, even if the chest portion hits against the ring portion later. Meanwhile, since the bag portion is pushed forward by hitting of the driver's chest portion, it may be preferable that a tether is provided in the bag portion and the forward movement of the bag portion is suppressed by this tether. According to the present invention, however, a bag outer layer forming an inner peripheral surface of a hollow portion of the bag portion functions as the tether and thereby the forward movement of the bag portion can be suppressed as much as possible. Namely, since a rear-side part of the inner peripheral surface contacts a rear-side edge portion of the fixed cover portion when the bag portion is pushed forward, a central portion of an top end face of the inflated bag portion and the fixed cover portion come to form a state where they were coupled via the outer layer forming the inner peripheral surface of the hollow portion of the bag portion. Thus, the forward movement of the bag portion can be suppressed properly without providing any tether. As a consequent, the driver's head can be controlled so as to hit against the top end face of the inflated bag potion, so the driver' head can be protected surely. Thereby, the proper protection of the head and chest portion of the driver can be attained.

According to an embodiment of the present invention, a front-side part of the open cover portion that is located forward relative to the fixed cover portion in a vehicle traveling direction is configured so as to open forward around a hinge portion that is located near a front-side end of the cover member on an opposite side to a location of a driver's head relative to the ring portion.

Generally, the front-side end of the cover member has a curve shape in which its center projects forward from a design or functional point of view (for example, a proper operation of the steering wheel). Herein, if the hinge portion was provided near the curve-shaped front-side end, the hinge portion would become short. Thereby, a rotational resistance of the opening front-side part of the open cover portion would become small. Herein, since the hinge portion is provided on the opposite side to the location of the driver's head relative to the ring portion, when the front-side part of the open cover portion has opened, it is located on the opposite side to the location of the driver's head. Accordingly, the front-side part of the open cover portion could not suppress properly the forward movement of the bag portion by hitting of the driver's chest portion. According to the present embodiment, however, since the forward movement of the bag portion can be suppressed as much as possible by the above-described outer layer of the inner peripheral surface of the hollow portion of the bag portion, the proper protection of the head and chest portion of the driver can be attained.

According to another embodiment of the present invention, a meter is provided at an instrument panel in front of the ring portion, and part of the cover member that extends forward in the vehicle traveling direction from a front-side boundary of the fixed cover portion and the front-side part of the open cover portion to the front-side end of the cover member is configured so as to be inclined toward the opposite side to the location of the driver's head, whereby the driver can have a view of the meter through a front-side space formed between the pad portion and the ring portion.

Thereby, the visibility of the meter by the driver can be improved. Even though the hinge portion at the front-side part of the open cover portion is located on the opposite side to the location of a driver's head relative to the ring portion, the forward movement of the bag portion can be suppressed as much as possible by adopting the structure of the above-described embodiment. Thus, the proper protection of the head and the chest portion of the driver can be attained with improving the visibility of the meter by the driver.

According to another embodiment of the present invention, an outer peripheral portion of the fixed cover portion that is located on a side of a location of a driver's head is configured so as to be disposed substantially on the same level as an inner peripheral portion of said open cover portion or to project toward the driver's head.

Thereby, a length of a portion that functions as the tether (a length of the inner peripheral surface of the hollow portion from the fixed cover member and the top end face of the inflated bag portion) is made short due to the above-described outer peripheral portion of the fixed cover portion projecting toward the driver's head, thereby increasing a force to suppress the frontward movement of the bag portion. Thus, the frontward movement of the bag portion can be suppressed further.

According to another embodiment of the present invention, the fixed cover portion is of a substantially circular shape when viewed from the driver's-head side.

Thereby, the length of the portion functioning as the tether can be made be the same regardless of a rotational axis position (searing angle position) of the ring portion of the steering wheel, so the protection of the head and chest portion of the driver at the vehicle frontal crash can be attained properly in both the vehicle straight-forward traveling state and the vehicle turning traveling state.

According to further another embodiment of the present invention, the pad portion is provided relative to the ring portion in a vehicle traveling direction such that a distance between a front-side end of the cover member of the pad portion and a front-side end of an inner peripheral portion of the ring portion is greater than a distance between a rear-side end of the cover member of the pad portion and a rear-side end of the inner peripheral portion of the ring portion, a rear-side part of the ring portion is configured to be deformable by hitting of a driver's body moving forward at the vehicle frontal crash, the open cover portion is comprised of a plurality of parts that open separately at the inflation of the bag portion, and a rear-side part of the open cover portion that is located rearward relative to the fixed cover portion is configured so as to open laterally around a hinge portion that is located near a side end of the cover member of the pad portion.

Accordingly, the rear-side part of the open cover portion opens laterally, not rearward, relative to the pad portion. Thereby, even if the rear-side part of the ring portion is deformed forward by hitting of the driver's chest portion or the like at the vehicle frontal crash, the rear-side part of the open cover portion can be prevented from interfering with the rear-side part of the ring portion when it opens. As a consequence, the impact to the driver's chest portion or the like can be reduced properly, and the rear-side part of the open cover portion can be prevented from getting broken by such interference, so a situation where its broken parts would be scattered toward the driver can be avoided. Thus, the protection of the driver can be improved.

According to another embodiment of the present invention, the hinge portion of the rear-side part of the open cover portion is located near a connecting portion of the pad portion to the spoke portion, and the rear-side part of the open cover portion is configured to open over the spoke portion.

Thereby, since the rear-side part of the open cover portion is supported by the pad portion and the spoke portion when it has opened, it can be surely prevented from getting broken.

According to another embodiment of the present invention, the pad portion is provided relative to the ring portion in a vehicle traveling direction such that a distance between a front-side end of the cover member of the pad portion and a front-side end of an inner peripheral portion of the ring portion is greater than a distance between a rear-side end of the cover member of the pad portion and a rear-side end of the inner peripheral portion of the ring portion, a rear-side part of the ring portion is configured to be deformable by hitting of a driver's body moving forward at the vehicle frontal crash, the open cover portion is comprised of a plurality of parts that open separately at the inflation of the bag portion, and a rear-side part of the open cover portion that is located rearward relative to the fixed cover portion is configured so as to open rearward around a hinge portion that is located near a rear end of the cover member of the pad portion, whereby the rear-side part of the cover member can open and move forward getting through a space formed between the pad portion and the ring portion.

According to the above-described embodiment, although the rear-side part of the open cover portion opens rearward, the timing of the forward deformation of the rear-side part of the ring portion is after the rear-side part of the open cover portion has opened. Namely, the rear-side part of the open cover portion has already got through the space between the pad portion and the ring portion when the rear-side part of the ring portion is deformed. Thus, the rear-side part of the open cover portion can be surely prevented from interfering with the rear-side part of the ring portion when it opens.

According to further another embodiment of the present invention, the pad portion is provided relative to the ring portion in a vehicle traveling direction such that a distance between a front-side end of the cover member of the pad portion and a front-side end of an inner peripheral portion of the ring portion is greater than a distance between a rear-side end of the cover member of the pad portion and a rear-side end of the inner peripheral portion of the ring portion, the open cover portion is comprised of a plurality of parts that open separately at the inflation of the bag portion, and a rear-side part of the open cover portion that is located rearward relative to the fixed cover portion is configured so as to be supported partially at the pad portion and open without contacting a rear-side part of the ring portion, whereby the rear-side part of the open cover portion that has opened does not cover a space formed between the pad portion and the ring portion.

According to the above-described embodiment, the rear-side part of the open cover portion does not cover the space formed between the pad portion and the ring portion after it has opened. Namely, when the driver's body (chest portion) hits against the rear-side end portion of the inflated bag portion, part of this bag portion corresponding to the space between the pad portion and the ring portion can get through this space and move forward without being interfered (blocked) by the rear-side part of the open cover that has opened. As a result, part of the bag portion at which the driver's body hits is allowed to be deformed easily, and thereby the impact force by the above-described hitting can be reduced. Thus, the driver's protection can be improved.

According to another embodiment of the present invention, an operational switch for an onboard device is provided near a rear-side end of the pad portion behind the rear-side part of the open cover portion.

Thereby, the operational switch can be operated more easily compared to a case where such a switch is provided at a vehicle instrument panel or the like. Further, a longitudinal length of the rear-side part of the open cover portion becomes shorter due to providing a layout space for the operational switch at the pad portion. Thus, the rear-side part of the open cover portion is less likely to contact the rear-side part of the ring portion when it opens, and thereby the situation where the rear-side part of the open cover portion that has opened covers the space formed between the pad portion and the ring portion is less likely to happen. Namely, the structure in which the rear-side part of the open cover portion that has opened doe not cover the above-described space can be attained easily.

According to another embodiment of the present invention, a portion of the rear-side part of the open cover portion that is supported at the pad portion is a hinge portion that is provided near a side end of the cover member of the pad portion, and the rear-side part of the open cover portion is configured so as to open laterally around the hinge portion.

Thereby, since the rear-side part of the open cover portion open laterally relative to the pad portion, not rearward, even if the longitudinal length of the rear-side part of the open cover portion is long, the situation where the rear-side part of the open cover that has opened covers the space formed between the pad portion and the ring portion is less likely to happen. Thus, the structure in which the rear-side part of the open cover portion that has opened does not cover the space can be attained easily and surely, and design flexibility of shape of the rear-side part of the open cover portion can be improved.

According to further another embodiment of the present invention, the bag portion is configured to inflate in such a manner that the bag portion gets out of the opening portion formed by opening of the open cover portion and expands with a hollow portion of thereof that is formed at a central portion of the bag portion above the fixed cover portion and shrinks gradually according to an expansion of the bag portion, and that when the bag portion is substantially fully inflated, an inner peripheral surface of the shrinking hollow portion contacts each other with a substantial elimination of the hollow portion, whereby a face of the driver can hit against a central portion of a top end face of the bag portion where the eliminated hollow portion is located at the vehicle frontal crash.

Generally, the central portion of the top end face of the inflated bag portion is softer and more deformable than any other parts of the bag portion for a compression force, even in its fully inflated state. Thus, by arranging such that the driver's face hits against the central portion of the top end face of the bag portion, the impact to the driver's face can be reduced. Herein, generally, in the case where the ring portion of the steering wheel is disposed to be inclined relative to the vertical direction with the inclined angle between 40 and 90 degrees, the driver's chest portion hits against the rear-side part of the inflated bag portion and the driver's face hits against the top end face of the inflated bag portion. Therefore, by setting such that a radius of the top end face of the inflated bag portion is almost equal to a distance between the driver's chest portion and the center of the driver's face (herein, a body size of the driver may be assumed with an average body size of an American male adult), the driver's face can be made hit against the central portion of the top end face of the inflated bag portion easily and properly. Thus, the proper protection of the driver can be provided.

According to another embodiment of the present invention, there is provided a seatbelt device to restrict a forward movement of the driver at the vehicle frontal crash within a specified range.

Thereby, the impact to the driver's chest potion can be further reduced, and the driver's face can be made hit against the central portion of the top end face of the inflated bag portion more easily and properly and thereby the impact to the driver's face can be further reduced as well.

According to another embodiment of the present invention, the airbag device is configured such that an amount of gas that is supplied to the bag portion when an impact of the vehicle frontal crash is relatively low is smaller than that when the impact of the vehicle frontal crash is relatively high.

Thereby, since the gas amount supplied becomes smaller at a relatively light vehicle crash, the impact the driver receives at the face at the relatively light vehicle crash can be properly reduced.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Embodiment 1

Figure 1:
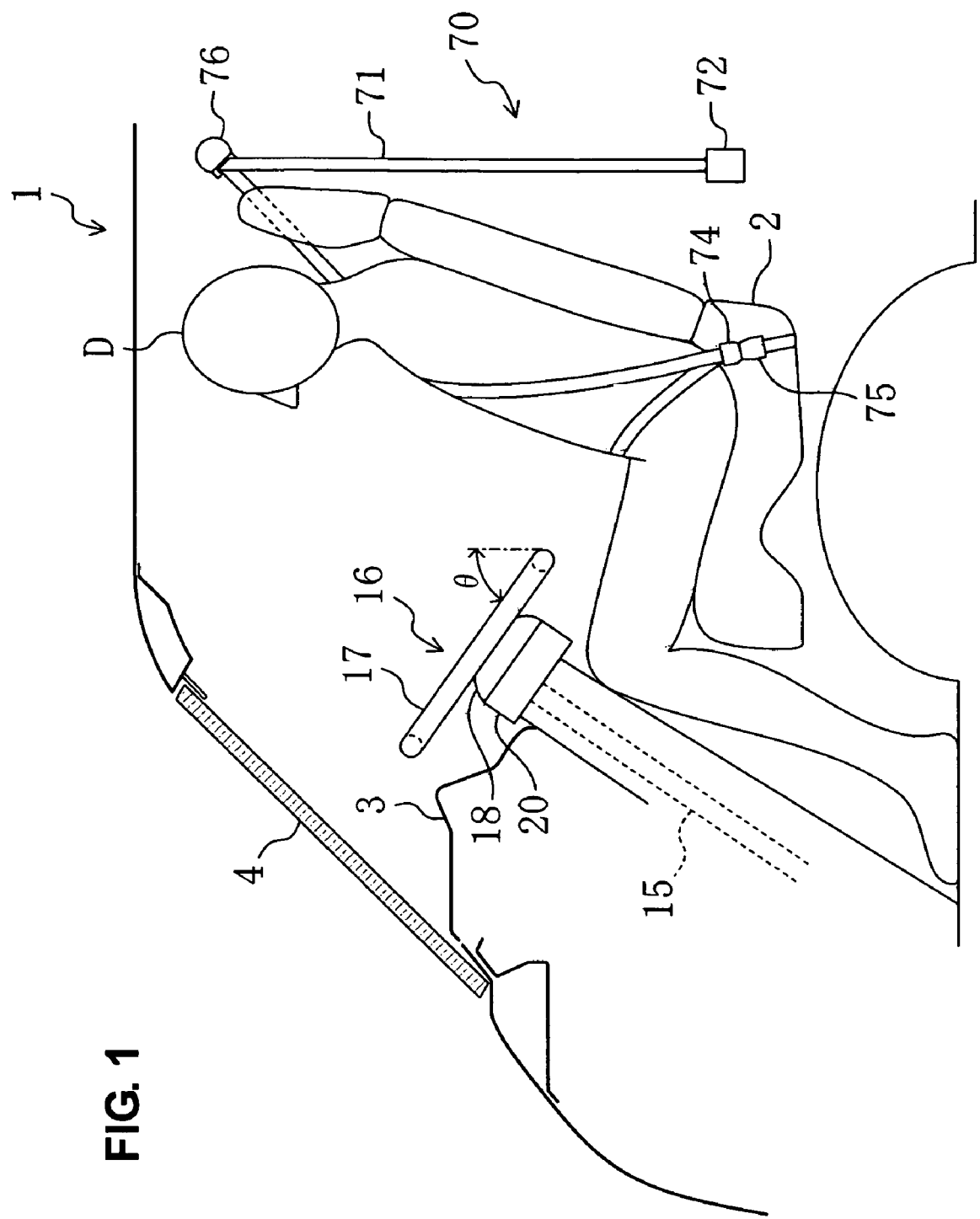
FIG. 1 is a side view of part of a vehicle around a driver's seat that has a steering wheel according to an embodiment 1 of the present invention.

FIG. 1 schematically shows part of a vehicle 1 around a driver's seat 2 that has a steering wheel 16 according to an embodiment 1 of the present invention (herein, the vehicle is a so-called one-box car with a high vehicle height, including a truck, a bus, etc.). An instrument panel 3 that is made of synthetic resin is provided at a front end part in a cabin of the vehicle 1, and a windshield 4 is provided above the instrument panel 3.

Figure 2:
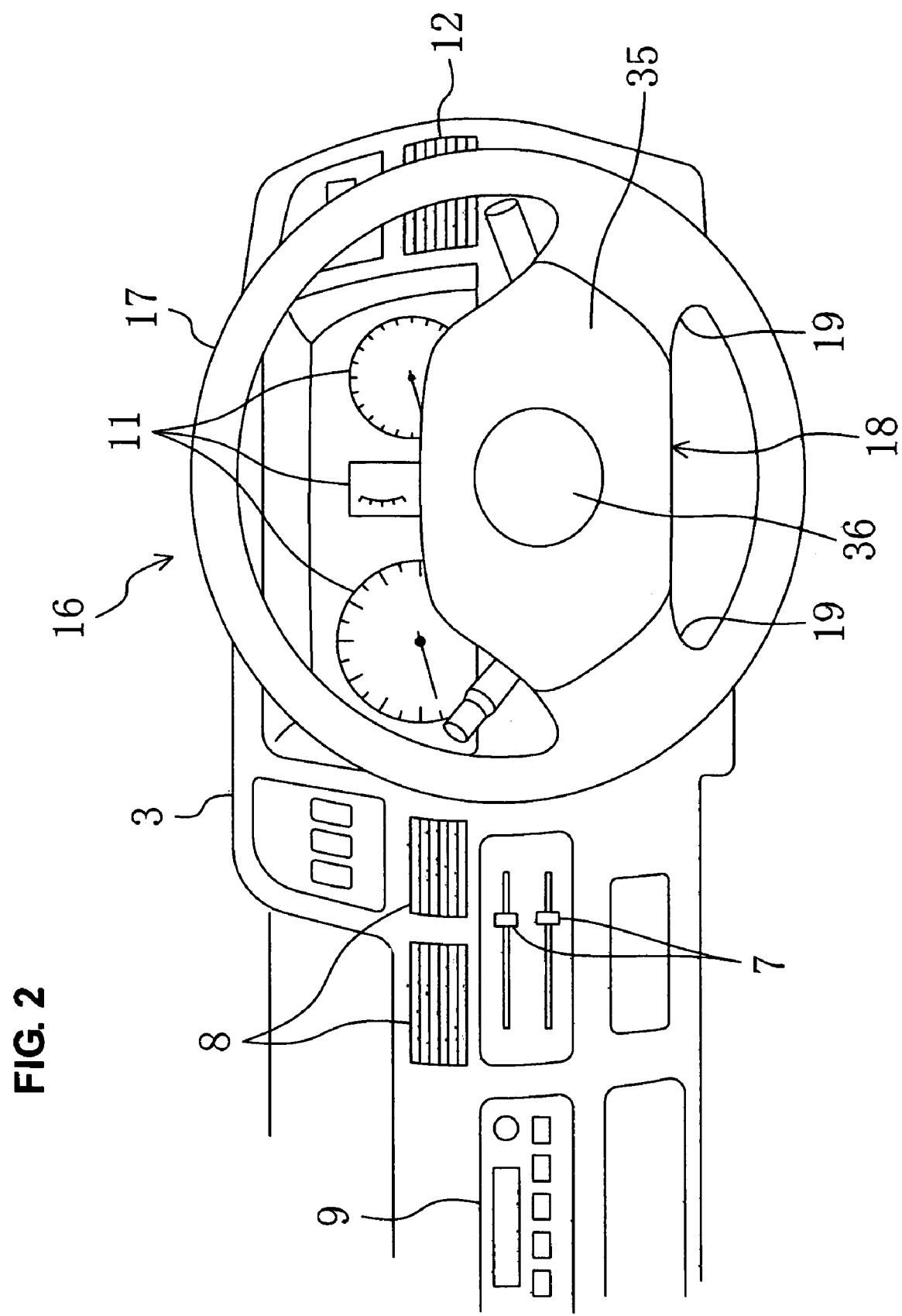
FIG. 2 is a view of part of an instrument panel and the steering wheel of the vehicle, when viewed from back of the vehicle.

At a central portion of the instrument panel 3 are provided an air conditioner operational switches 7 to adjust the temperature and amount of conditioning air, a center ventilator 8 to blow off the conditioning air, an audio device 9 and so on, as shown in FIG. 2. At part of the instrument panel 3 in front of the driver's seat 2 are provided meters, such as a speed meter, an engine speed meter and an engine temperature sensor. At a side part of the instrument panel 3 beside the driver's seat 2 (herein, on the right side) are provided a side ventilator 12 and so on.

A steering shaft 15 is disposed below the meters 11 at the instrument panel 3, extending upward and rearward, and a steering wheel 16 is attached to an upper end of the steering shaft 15 via a column 20.

Figure 3:
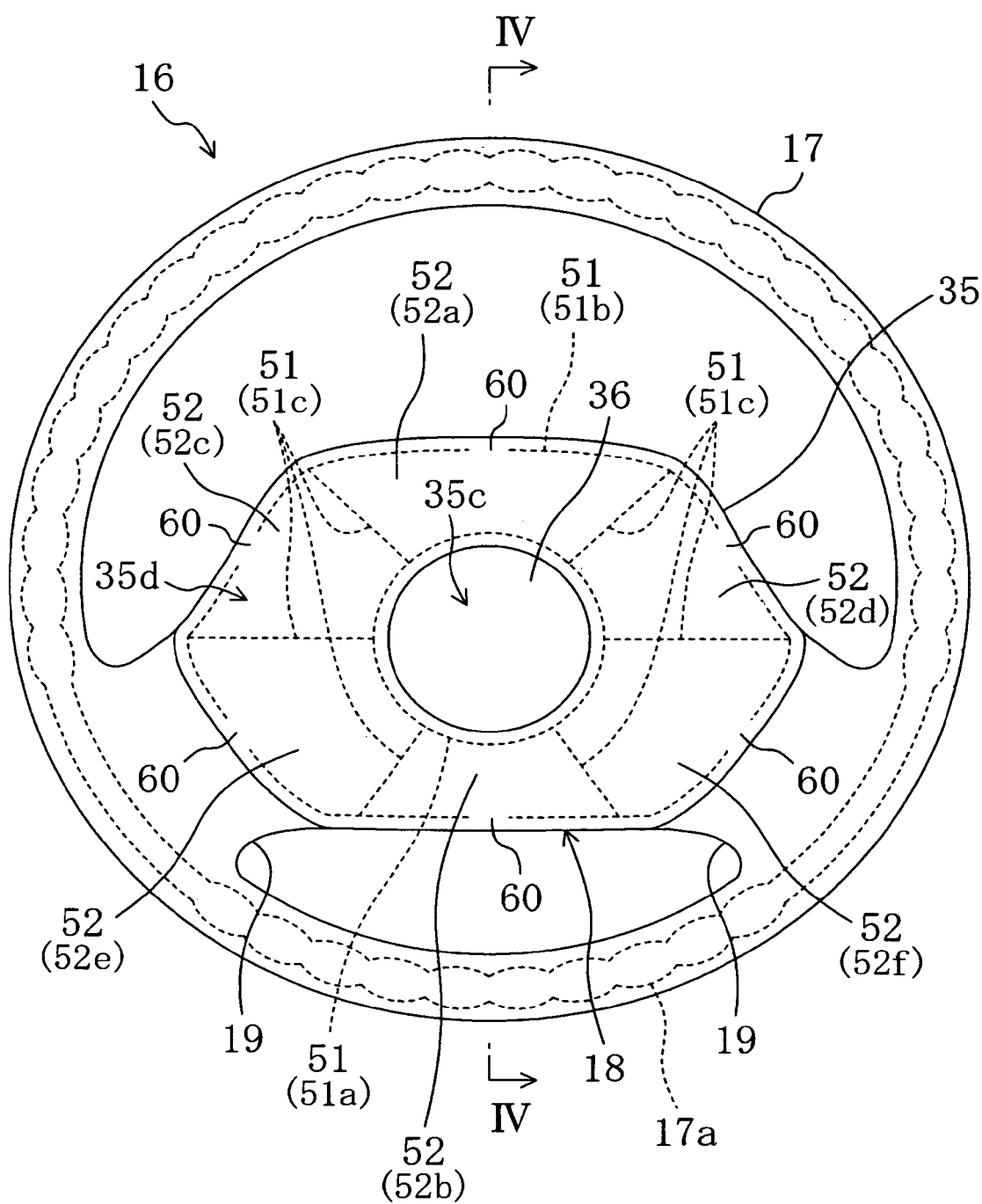
FIG. 3 is a view of the steering wheel, when viewed from a side of a driver's head.

The steering wheel 16, as shown in FIG. 3, comprises a ring portion 17 to be griped by a driver D (herein, a person having an average body size of an American male adult) and a pad portion 18 that is coupled to the ring portion 17 via two spoke portions 19 and located at a central portion of the ring portion 17. An airbag device 25 having an bag portion 26 that is operative to inflate at a vehicle frontal crash, which will be described below in detail, is disposed in the pad portion 18 (see FIG. 4). The ring portion 17 is disposed to be inclined relative to a vertical direction with an inclined angle θ between 40 and 90 degrees (see FIG. 1). The inclined angle θ between 45 and 85 degrees would be preferable. Hereinafter, descriptions will be done assuming that a rotational position of the steering wheel 16 is in a position in which the vehicle 1 is a straight-forward traveling state (i.e., a steering angle of 0 degree).

The ring portion 17 comprises a core member 17a that is covered with synthetic resin such as urethane. At the core member 17a are provided constricted parts that are formed at intervals except parts corresponding to the spoke portion 19. Thereby, when a specified magnitude of force acts on a portion of the ring portion 17 corresponding to this constricted parts, this portion of the ring portion 17 is deformed inside the steering wheel. Namely, as described below in detail, when an upper body (chest portion) of the driver D hits against an rear-side part of the ring portion 17 at the vehicle frontal crash, this rear-side part of the ring portion 17 is deformed forward. Herein, the core member 17a with an uniform small diameter may be applied instead.

The pad portion 18 of the steering wheel 16 is disposed such that its center is offset forward from the center of the ring portion 17 (an axis of the steering shaft). These spoke portions 19 interconnect rear-side parts of both-side edge portions of the pad portion 18 and rear-side parts of both-side inner peripheral portions of the ring portion 17. Thereby, two spaces are formed between the pad portion 18 and the ring portion 17 at the front and rear of the pad portion 18. The front space is formed to be larger than the rear one. Accordingly, the driver D can have a clearer view of the above-described meters 11 through the larger front space.

Figure 4:
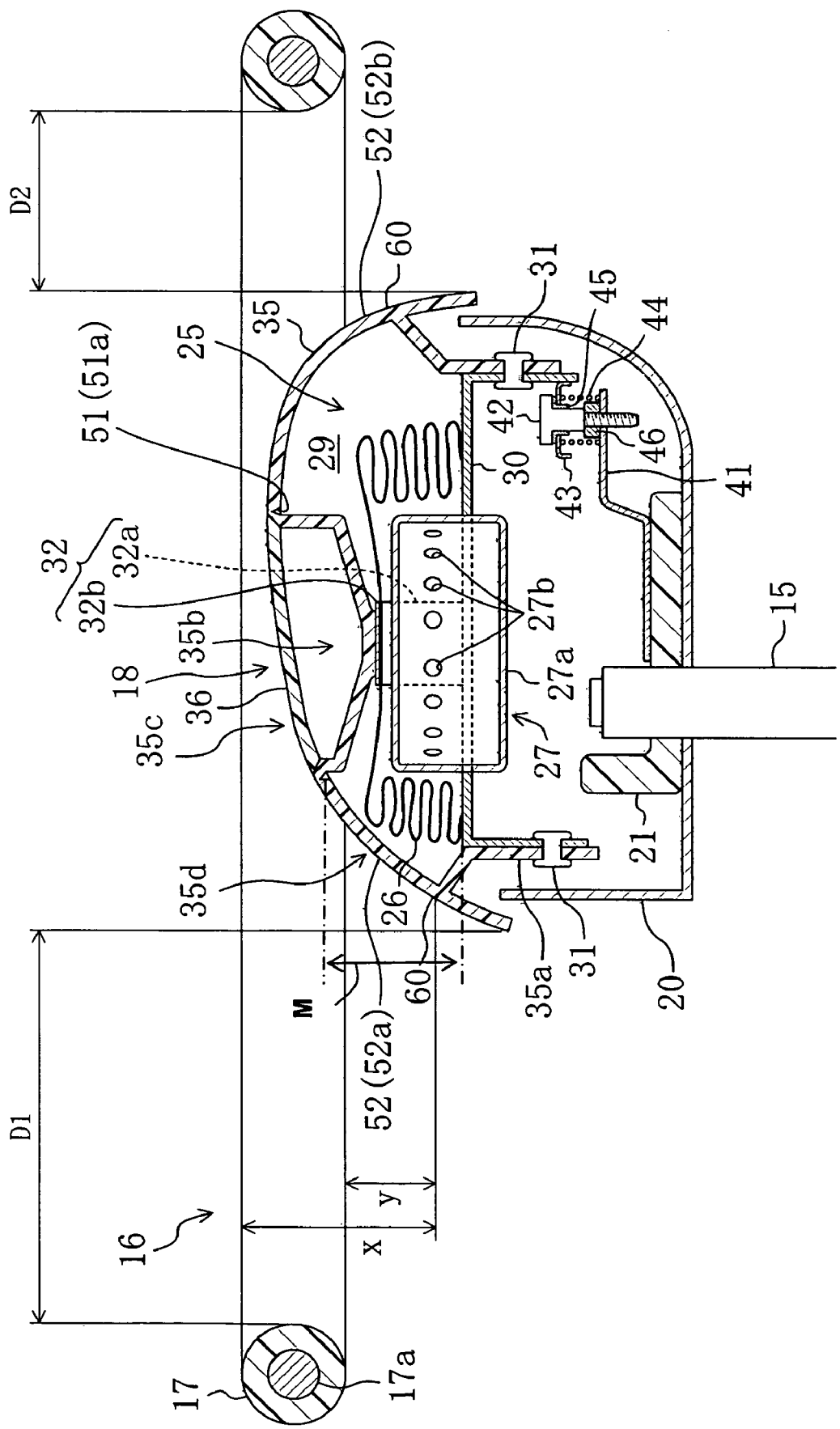
FIG. 4 is a sectional view taken along line IV-IV of FIG. 3.

An upper side of the pad portion 18 that is located on a side of a location of a driver's head (an inflatable side of the bag portion 26) is comprised of a cover member 35 that is made of resin such as polypropylene as shown in FIG. 4. The cover member 35 includes a cylindrical support portion 35a extending downward at its inner peripheral edge, and this support portion 35a is fixed to a base portion 30 via pins 31 that is made of steel plate in such a manner that a space is formed inside the cover member 35.

A recess 35b is formed at a central portion of the cover member 35 on a side of the column 20. A decorative cover 36 covers an opening of the recess 35b. It is preferable that accessories such as an emblem, operational switches such as the audio device 9 and air conditioner, or indication devices by liquid crystal or EL are provided at the decorative cover 36. Mechanical parts of such operational switches may be disposed in the recess 35b. Hereinafter, the decorative cover 36 and a side peripheral wall and a bottom wall of the recess 35b is referred to as a cover central portion 35c of the cover member 35, and part of the cover member 35 that is located on outer peripheral side (except the support portion 35a) is referred to as a cover peripheral portion 35d.

The cover central portion 35c of the present embodiment is of a substantially circular shape, when viewed from the driver's-head side, and an outer peripheral portion of the cover central portion 35c on the driver's-head side is disposed substantially on the same level (for example, within ±0.5 cm of difference in level) as an inner peripheral portion of the cover peripheral portion 35d on the driver's-head side. However, it should not be limited to the above disposition.

An inflator 27 to form part of the airbag device 25 is disposed in the pad portion 18 at a location that corresponds to the cover central portion 35c. The inflator 27 includes a substantially cylindrical case 27a and is attached to the center of the base portion 30 so as to get through it. A space around the inflator 27 that is formed between the cover member 35 and the base portion 30 constitutes an accommodation portion 29 to accommodate the pad portion 26. The accommodation portion 29 is formed substantially in a ring shape, when view ed from the driver's head, and the bag portion 26 is folded and accommodated in this accommodation portion 29 substantially in the ring shape.

The case 27a of the inflator 27 contains gas generating material (not illustrated) that is ignited by an ignition plug (not illustrated) and generates inflatable gas at the vehicle frontal crash. The inflatable gas generated is supplied to the bag portion 26 through gas injection nozzles 27b formed at the side face of the case 27a to inflate the bag portion 26.

The airbag device 25 of the present embodiment is a so-called dual airbag device, in which two chambers separated in the case 27a contains the gas generating materials and ignition plugs, respectively. An ignition operation device is configured to operate only one of the plugs or both plugs at the same time. Thus, the amount of inflatable gas supplied to the bag portion 26 can be adjusted in two stages. Namely, when only one of plugs is operated and thereby the gas generating material in one of chambers is ignited, the gas amount supplied is relatively small. When both plugs are operated and thereby the gas generating materials in both chambers are ignited, the gas amount supplied is relatively large. The ignition operation device constitutes a gas-amount adjusting device to adjust the amount of inflatable gas supplied to the bag portion 26.

Further, according to the present embodiment, a controller (not illustrated) as a determining device determines the impact of the vehicle frontal crash based on a crash accelerator against an obstacle of the vehicle, a vehicle speed prior to the crash, a changing speed of a distance between the obstacle and the vehicle, or the like. The ignition operation device is configured such that the gas amount supplied to the bag portion 26 when the impact determined by the controller is relatively low is smaller than that when the impact determined by the controller is relatively high. Namely, when the impact determined by the controller is relatively low (light crash), the ignition operation device operates only one of plugs and the gas generating material in one of chambers is ignited. Meanwhile, when the impact determined by the controller is relatively high (heavy crash), the ignition operation device operates both plugs and the gas generating materials in both chambers are ignited. Herein, although the gas pressure in the inflated bag portion 26 changes according to the one-plug operation or the two-plug operation, the shape of the bag portion 26 when the inflation is complete, which will be described later, is substantially the same in both cases.

A support bracket 32 is fixed to the base portion 30 so as to extend over the inflator 27. This support bracket 32, which is attached to the base portion 30 at both-side portions of the inflator 27, comprises two side plate portions 32a that extend toward the bottom wall of the recess 35b at the cover central portion 35c and a top plate portion 32b that passes through between the inflator 27 and the above-described bottom wall and interconnect tip portions of the both side plate portions 32a. The top plate portion 32b and the bottom wall are connected by bolts (not illustrated).

The bag portion 26 is formed in a bag shape, and it is accommodated in the accommodation portion 29 in such a manner that its opening edge portion faces the base portion 30 and cover the inflator 27. An entire periphery of the opening edge portion of the bag portion 26 is fixed to the base portion 30 around the inflator 27, and a bottom of the bag portion 26 is inserted between the bottom wall of the recess 35b at the cover central portion 35c and the top plate portion 32b of the support bracket 32. Thus, the cover central portion 35c is located at the center of the bag portion 26 accommodated in the accommodation portion 29.

The above-described column 20 is fixed to the top of the steering shaft 15 via a core member 21, covering part of the pad portion 18 that is on an opposite side to a location of the driver's head. On a face of the core member 21 that is on the side of pad portion 18 is fixed a hone plate 41, and to a tip of the hone plate is fixed a support pin 42 extending along the center axis of the ring portion. Meanwhile, to a rear-side end of the base portion 30 is fixed a receiving plate member 43. This plate member 43 is provided so as to move relative to the support pin 42. A compression coil spring 44 biases the plate member 43 toward the pad portion 18, so the plate member 43 is pushed to a larger tip of the support pin 42. Thereby, when the driver D pushes the pad portion 18 toward the column 20, the receiving plate member 43 slides toward the hone plate 41 against the spring force of the compression coil spring 44.

A first contact 45 is provided at an inner peripheral portion of the plate member 43 through which the support pin 42 goes. Meanwhile, a second contact 46 is provided at the support pin 42 on the side of the hone plate 41. By contacting of the contacts 45, 46, a hone circuit is closed to operate the hone.

As shown in FIGS. 3 and 4, tear groves 51 with a V-shaped section are formed at an inside face of the cover member 35 of the pad portion 18. Namely, the tear grooves 51 are formed at a boundary part between the cover central portion 35c and the cover peripheral portion 35d, a cover central part of the cover peripheral portion 35d that is located at a base of the support portion 35a, and six parts in a peripheral direction of the cover peripheral portion 35d. Hereinafter, the tear grooves 51 formed at the above-described portions will be referred to as the following: an inside tear groove 51a at the boundary part; an outside tear groove 51b at the cover central part, and middle tear grooves 51c at the six parts in the peripheral direction.

The middle tear grooves 51c extend from the inside tear groove 51a to the outside tear groove 51b in a radial direction. Thus, part of the cover peripheral portion 35d except the outer peripheral end portion is divided into six parts 52 by the grooves 51a, 51b, 51c. Hereinafter, these six divided parts will be referred to as the following: a front-side part 52a on the front side; a rear-side part 52b on the rear side; a front-left-side part 52c on the front and left side; a front-right-side part 52d on the front and right side; a rear-left-side part 52e on the rear and left side; a rear-right-side part 52f on the rear and right side. The rear-left-side part 52e and the rear-right-side part 52f are located at the spokes 19, respectively.

The outside tear groove 51b has cut portions that are located at the center of the respective divided portions 52. These cut portions are formed as the hinge portions 60 for the respective parts 52 to open.

The tear grooves 51 formed at the cover member 35 are configured to be torn off by the pressure of the bag portion 26 that inflates. Herein, the hinge portion 60 of the cut portion is not torn off. Thereby, the front-side part 52a is separated from the front-left-side part 52c and the front-right-side part 52d and rotates around the hinge portion 60 to open forward relative to the bad potion 18 (see FIG. 5). The rear-side part 52b is separated from the rear-left-side part 52e and the rear-right-side part 52f, and rotates around the hinge portion 60 to open rearward relative to the bad potion 18. Likewise, the front-left-side part 52c, the front-right-side part 52d, the rear-left-side part 52e, and the rear-right-side part 52f are separated from each other and rotate around the respective hinge portions 60 to open toward the front left, front right, rear left and rear right, respectively. Thus, the respective parts 52 open as a plurality of parts with the pressure of the inflated bag portion 26.

After the respective parts 52 has opened, the opening portion in the substantially ring shape for the bag portion 26 being inflated outside the pad portion 18 is formed at the place the parts 52 have existed. Meanwhile, since the cover central portion 35c is fixed to the base portion 30 via the support bracket 32, it stays there without opening when the bag portion 26 is inflated. Thus, the cover central portion 35c corresponds to the central part of the bag portion 26 accommodated in the accommodation portion 29 and also to the fixed cover portion that does not open at the inflation of the bag portion 26, and the parts 52 correspond to the open cover portion that opens so as to form the opening portion in the substantially ring shape for the bag portion 26 being inflated outside. Also, this open cover portion is comprised of a plurality of parts 52a-52f that open separately at the inflation of the bag portion. The front-side part 52a corresponds to a front-side part of the open cover portion that is located forward relative to the fixed cover portion.

As shown in FIG. 4, the part of the cover member 35 that extends forward from the front-side boundary of the cover central portion 35c and the front-side part 52a to the front-side end of the cover member 35 is configured to be inclined toward the opposite side to the location of the driver's head. Thereby, the driver D can have a view of the meters 11 through a front-side space formed between the pad portion 18 and the ring portion 17. Herein, the above-described inclination contains a curve shape, and a degree of the curve shape is gentler than that of the rear-side part 52b. Thus, the front-side end of the cover member 35 or the part located near this end are located on the side opposite to the driver's head relative to the ring portion 17. And, the hinge portion 60 of the front-side part 52a is located near the front side end of the cover member 35. Thereby, the hinge portion 60 of the front-side part 52a is located on the side opposite to the driver's head relative to the ring portion 17 (at a location of a specified distance x away from a driver's head side edge of the ring portion 17, preferably y away from an opposite edge to the driver's head side).

Also, the part of the cover member 35 that extends rearward from the rear-side boundary of the cover central portion 35c and the rear-side part 52b to the rear-side end of the cover member 35 is configured to be inclined toward the opposite side to the location of the driver's head. Thus, the rear-side end of the cover member 35 or the part located near this end are located on the side opposite to the driver's head relative to the ring portion 17, and the hinge portion 60 of the rear-side part 52b is located near this rear-side end of the cover member 35.

The pad portion 18 is provided relative to the ring portion 17 such that a distance D1 between a front-side end of the cover member 35 of the pad portion 18 and a front-side end of an inner peripheral portion of the ring portion 17 is greater than a distance D2 between a rear-side end of the cover member 35 of the pad portion 17 and a rear-side end of the inner peripheral portion of the ring portion 17. Thereby, the rear-side part 52b rotates around the hinge portion 60 provided at the rear-side end of the cover member 35 and open rearward, so the part 52b gets through the rear space between the pad portion 18 and the ring portion 17 and moves to the opposite side to the locations of the driver's head. Namely, the rear-side part 52b is configured to be supported partially at the pad portion 18 (at the hinge portion 60) and open without contacting the rear-side part of the ring portion 17, so the rear-side part 52b that has opened does not cover the space formed between the pad portion 18 and the ring portion 17.

Figure 5:
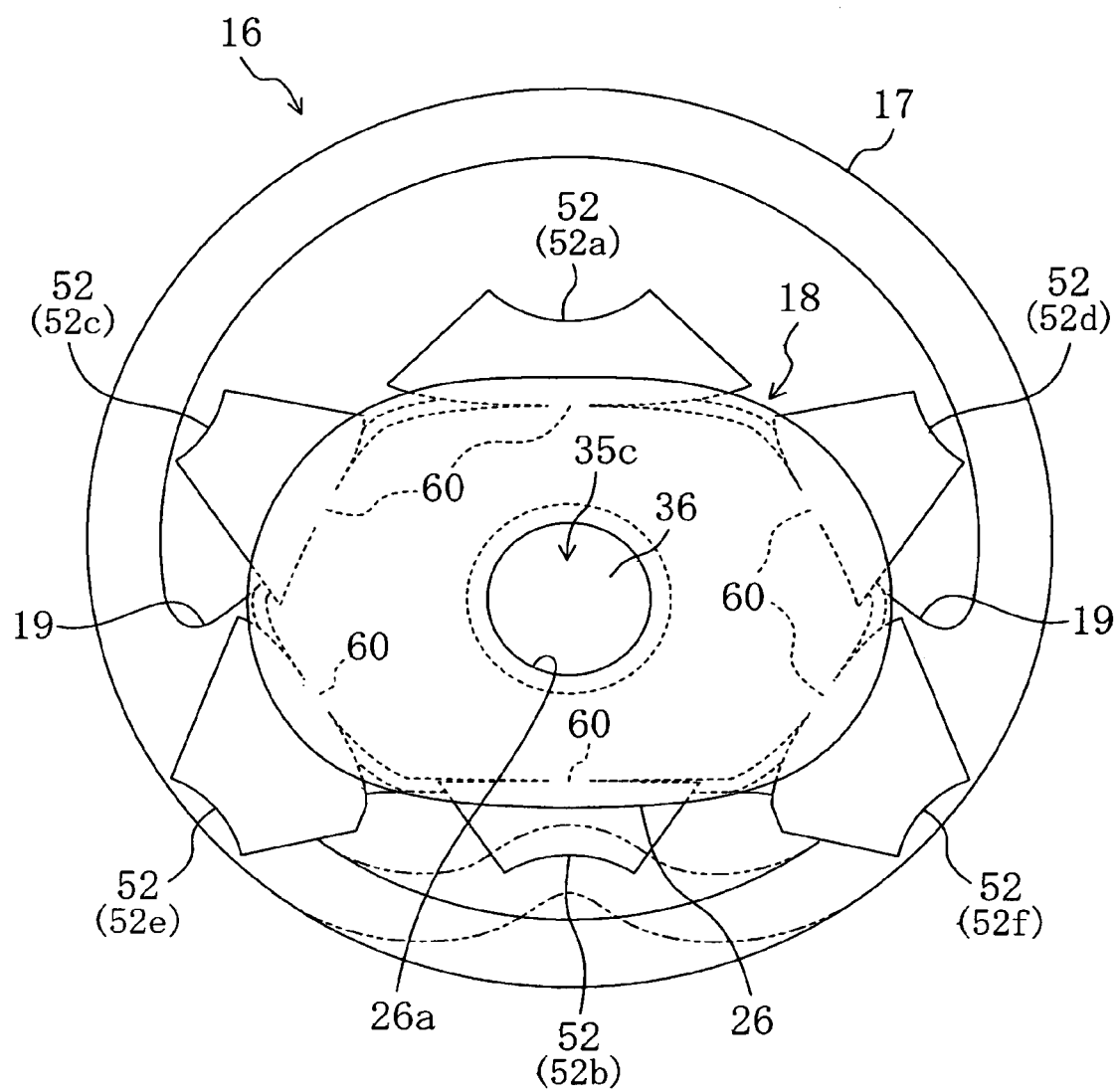
FIG. 5 is a view, which corresponds to FIG. 3, showing an initial inflation state of a bag portion of an airbag device.

As shown in FIG. 5, the bag portion 26 of the airbag device 25 is configured to inflate in such a manner that the bag portion 26 gets out of the opening portion formed by opening of the respective parts 52 and expands with a hollow portion 26a that is formed at a central portion of the bag portion 26 above the cover central portion 35c and shrinks gradually according to an expansion of the bag portion 26. Thereby, the bag portion 26 is inflated substantially in the ring shape toward the driver's head.

Figure 6:
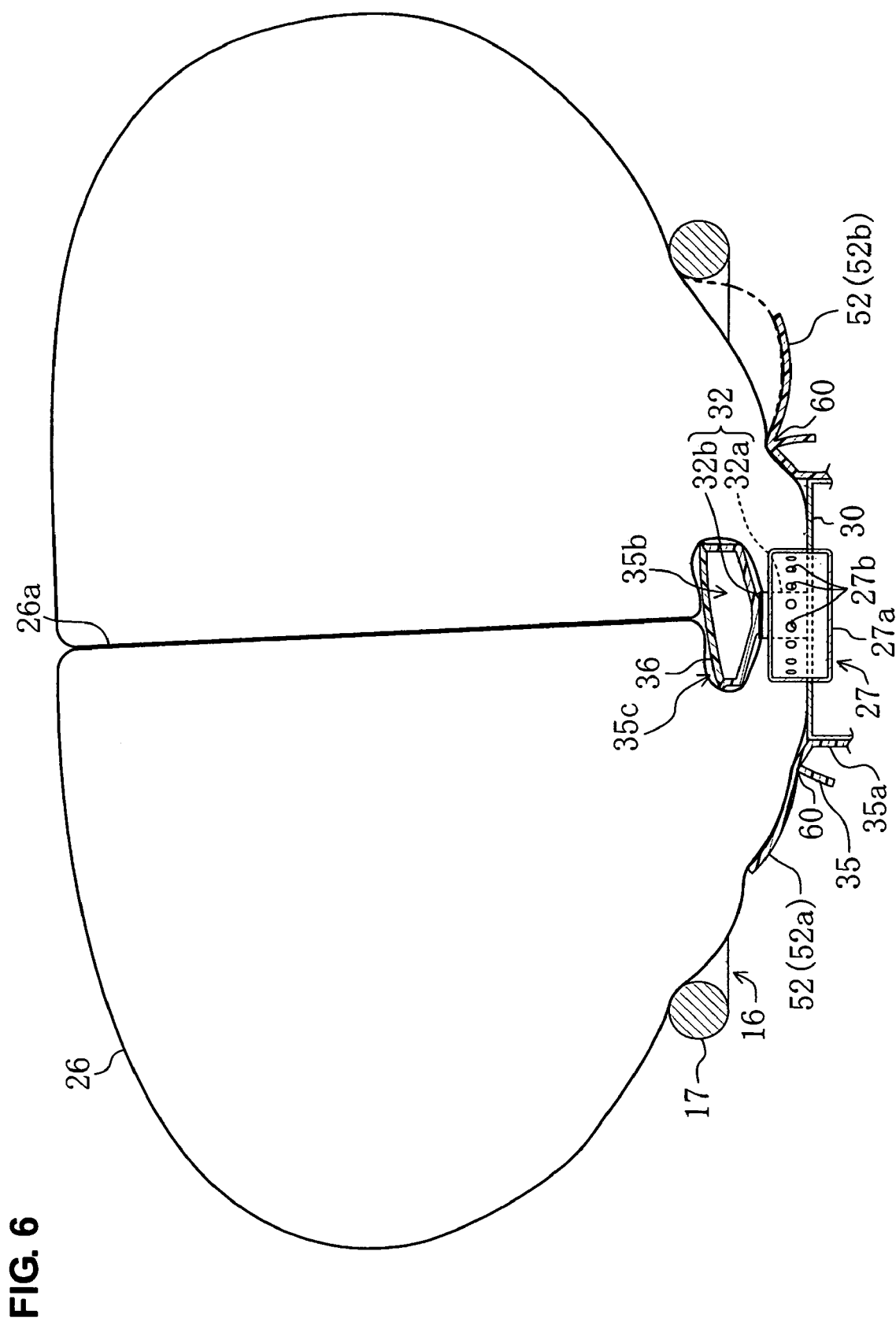
FIG. 6 is a sectional view, when viewed from a vehicle width direction, showing an inflation completed state of the bag portion of the airbag device.

And, as shown in FIG. 6, the bag portion 26 of the airbag device 25 is configured to inflate in such a manner that when the bag portion 26 is substantially fully inflated, an inner peripheral surface of the shrinking hollow portion 26a contacts each other with a substantial elimination of the hollow portion 26. Also, the bag portion 26 has a larger configuration than the ring portion 17 so as to cover over the ring portion 17 when the inflation is completed.

The vehicle 1 of the present embodiment, as shown in FIG. 1, is equipped with a seatbelt device 70 to restrict a forward movement of the driver D at the vehicle frontal crash within a specified range. Namely, the seatbelt device 70 is a three-point type of seat belt that comprises a retractor 72 to wind up a seatbelt 71, a lap anchor (not illustrated) attached to a tip of the seatbelt 71 drawn out of the retractor 72, and a buckle 75 to engage detachably with a tongue 74 that is placed at a middle position of the seatbelt 71. The buckle 75 is fixed to part of a vehicle body that is inside the driver's seat 2, and the retractor 72 and lap anchor are fixed to part of the vehicle body that is outside the driver's seat 2. A drawing direction of the seatbelt 71 drawn out of the retractor 72 is changed to a downward direction from an upward direction by a slip guide 76 that is provided at an upper portion outside the driver's seat 2, and its tip is attached to the above-described lap anchor. The tongue 74 is provided at the seatbelt 71 so as to be movable between the slip guide 76 and the lap anchor, and the application of the seatbelt 71 to the driver D is conducted by the tongue 74 having engaged with the buckle 75. There is further provided a load limiter mechanism at the retractor 72, which is well known but not illustrated here. When the upper body of the driver D moves forward at the vehicle frontal crash, a shaft of the load limiter mechanism twists and thereby the seatbelt 71 is drawn with a constant tension, so the forward movement of the driver D at the vehicle frontal crash can be restricted within the specified range. In the present embodiment, in the case where the vehicle 1 traveling at the speed of 30 km/h hits against the obstacle, the forward movement of a middle part of the upper body (a part corresponding to the breast born) of driver D can be restricted within a range of 20 to 30 cm.

Figure 7:
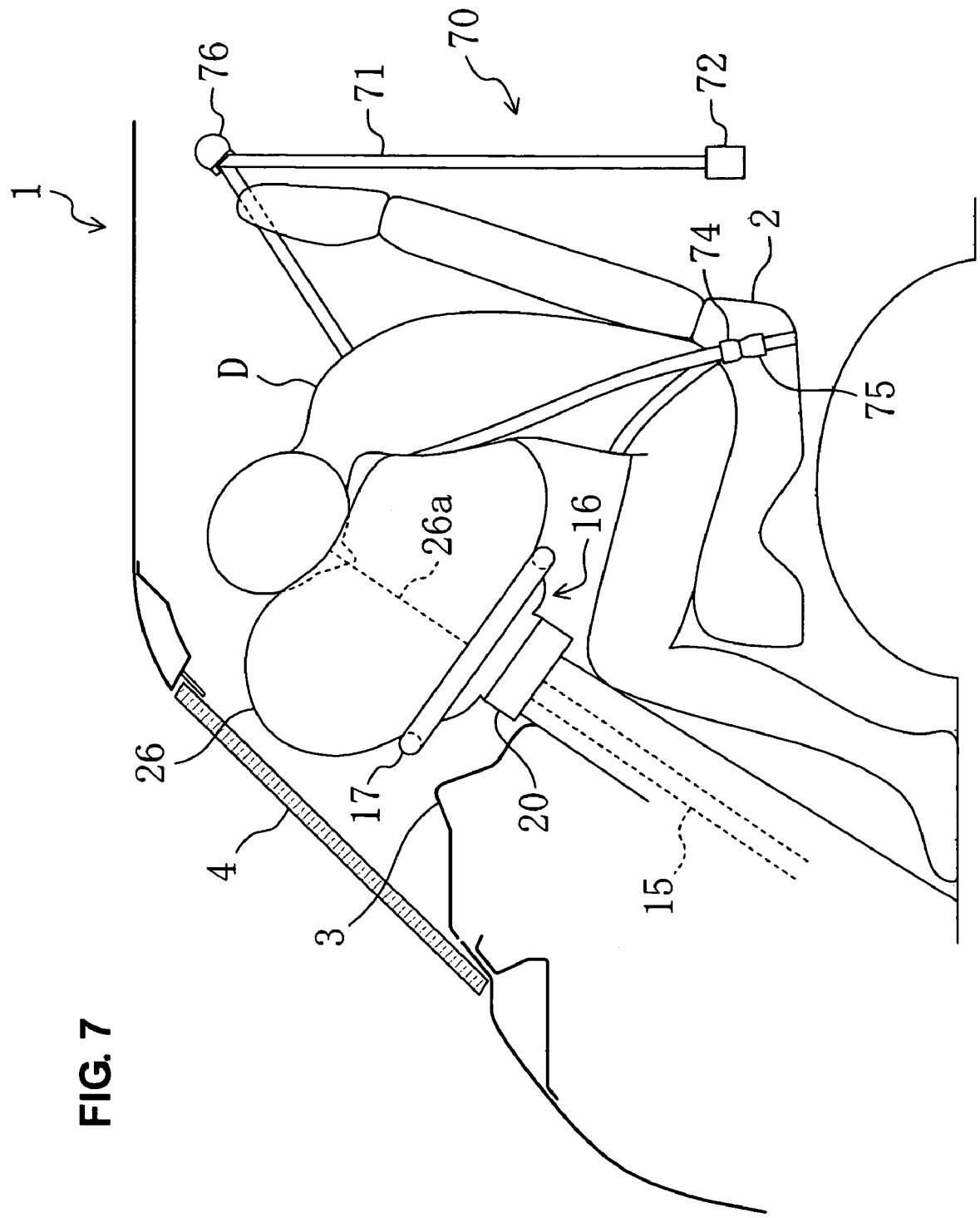
FIG. 7 is a view, which corresponds to FIG. 1, showing a state in which the driver hits against the bag portion of the airbag device.

As shown in FIG. 7, when the upper body of the driver D moves forward at the vehicle frontal crash, the face of the driver D is configured to hit against a central portion of a top end face (on the driver's head side) of the bag portion 26 where the above-described eliminated hollow portion 26a is located. In the present embodiment, the center of the driver's face is configured to hit against a point within a range of the radius of 20 cm (preferably, 10 cm) from the center of the top end face of the bag portion 26 (namely, the center of the hollow portion 26a). Thus, the central portion of the top end face of the inflated bag portion 26 is softer and more deformable than any other part of the bag portion 26 against a compression force, even in its fully inflated state. Thus, by arranging such that the driver's face hits against the central portion of the top end face of the bag portion 26, the impact to the face of the driver D can be reduced.

Herein, in the case where the ring portion 17 of the steering wheel 16 is inclined with the angle θ relative to the vertical direction, when viewed from the vehicle width direction, the driver's face can be made hit against the central portion of the top end face of the bag portion 26 properly by setting the radius of the top end face of the bag portion 26 to be substantially equal to a distance between the driver's chest portion and the driver's face. This is because generally the driver's chest hits against the rear part of the inflated bag portion 26 and the driver's face hits against the top end face of the bag portion 26.

Herein, there was a concern that at the vehicle frontal crash the steering wheel 16 would be pushed upward by the steering shaft 15 (especially, at the heavy crash) and move toward the driver's head, so that a driver's chest portion would hit against the rear-side part of the ring portion 17 of the steering wheel 16 before the driver's face hits against the top end of the inflated bag portion 26. Herein, according to the present invention, since the bag portion 26 has the larger configuration than the ring portion 17, the driver's chest portion can surely hits against a rear-side part of an outer peripheral portion of the pad portion 26 before hitting against the ring portion 17. Accordingly, the impact to the driver's chest portion can be reduced properly along with the load limiter mechanism, even if the chest portion hit against the ring portion 17 later.

Meanwhile, since the bag portion 26 is pushed forward by hitting of the driver's chest portion, there was a concern that the head of the driver D could not hit properly against the central portion of the top end face of the inflated bag portion 26. According to the present invention, however, a bag outer layer forming an inner peripheral surface of the hollow portion 26a of the bag portion 26 functions as a tether and thereby the forward movement of the bag portion 26 can be suppressed as much as possible. Namely, since a rear-side part of the inner peripheral surface contacts a rear-side edge portion of the cover central portion 35c when the bag portion 26 is pushed forward, the central portion of the top end face of the inflated bag portion 26 and the cover central portion 35c come to form a state where they were coupled via the outer layer forming the inner peripheral surface of the hollow portion 26a of the bag portion 26. Thus, the forward movement of the bag portion 26 can be suppressed properly without providing any tether.

Further, the outer peripheral portion of the cover central portion 35c is located upward with a distance M away from the base portion 30 (see FIG. 4) and the bag outer layer of the hollow portion 26a is fixed to this outer peripheral portion. Thereby, the above-described frontward movement of the bag portion 26 can be suppressed further. Namely, according to a general airbag device to inflate the bag portion without the hollow portion, there is provided the tether extending between the base portion 30 and the top end face of the bag portion to suppress the forward movement of the bag portion, and this tether may be relatively long and therefore a force for the suppressing the forward movement may be weakened. According to the airbag device 25 of the present embodiment, however, the length of the part that functions as the tether (the length of the inner peripheral surface of the hollow portion 26a from the cover central portion 35c and the top end face of the inflated bag portion 26) becomes shorter and thereby the force to suppress the frontward movement of the bag portion increases. Thus, the forward movement of the bag portion 26 can be suppressed properly without the tether. Since the cover central portion 35c is formed to be of the substantially circular shape in the present embodiment, the length of the portion functioning as the tether is substantially the same regardless of the rotational position of the steering wheel 16, so the same movement-suppressing effect can be provided at any rotational position of the steering wheel 16. The outer peripheral portion of the cover central portion 35c may be configured to project toward the driver's head instead of being disposed substantially on the same level as the inner peripheral portion of the cover peripheral portion 35d. However, it is preferable that this projection is not so great from a design point of view.

Also, in the general airbag device, there are provided a pair of longitudinal tear grooves and a lateral tear groove (H-shaped tear grooves) at the center of the cover member of the pad portion. When the bag portion inflated, a front-side part of the cover member located forward between the longitudinal tear grooves opens forward and a rear-side part of the cover member located rearward between them opens rearward. A hinge portion of the front-side part of the cover member is comprised of a straight portion between front ends of the two longitudinal tear grooves, and a hinge portion of the rear-side part of the cover member is comprised of a straight portion between rear ends of the two longitudinal tear grooves. Herein, the length of these hinge portions is relatively long and thus the rotational resistance is relatively great. Further, the fronts-side part of the cover member that has opened is located in front of the bag portion. Accordingly, when the bag portion is pushed forward as described above, this front-side part of the cover member that has opened suppress the forward movement of the bag portion along with the above-described tether.

Meanwhile, in the airbag device 25 of the present embodiment, as shown in FIG. 4, the hinge portion 60 of the front-side part 52a is located near the front-side end of the cover member 35 of the pad portion 18, and the front-side end of the cover member 35 has a curve shape in which its center projects forward from a design or functional point of view. Thereby, the length of the hinge portion 60 of the front-side part 52a is not longer than that of the above-described general airbag device with the H-shaped tear grooves, so the rotational resistance of the front-side part 52a becomes small. Herein, since the hinge portion 60 of the front-side part 52a is provided on the opposite side to the location of the driver's head relative to the ring portion 17, when the front-side part 52a has opened, it is located on the opposite side to the location of the driver's head (see FIG. 6). Accordingly, the front-side part 52a could not suppress properly the forward movement of the bag portion by hitting of the driver's chest portion. However, since the forward movement of the bag portion 26 can be suppressed as much as possible by the above-described outer layer of the inner peripheral surface of the hollow portion 26a of the bag portion 26, the proper protection of the head and chest portion of the driver can be attained. Thus, any deterioration of the design of the pad portion 18 and the visibility of the meters that may be caused by the suppression of the forward movement of the bag portion 26 by the front-side part 52a can be avoided.

According to the above-described embodiment, the bag portion 26 has the larger configuration than the ring portion 17 and the driver's face hits against the central portion of the top end face of the bag portion 26 where the eliminated hollow portion 26a is located at the vehicle frontal crash. Thereby, the head and chest portion of the driver D can be protected properly.

Herein, the driver's head may be made hits against a portion offset the central portion of the top end face of the bag portion 26. However, the driver's face hitting against the central portion of the top end face of the bag portion 26 is preferable from the best reduction of the impact to the driver's face.

Further, since the rear-side part 52b does not cover the space formed between the pad portion 18 and the ring portion 17 after it has opened, when the driver's body chest portion hits against the rear-side end portion of the inflated bag portion 26, part of this bag portion 26 corresponding to the space between the pad portion 18 and the ring portion 17 can get through this space and move forward without being interfered (blocked) by the rear-side part 52b that has opened, as shown by a two-dotted broken line in FIG. 6. As a result, the part of the bag portion 26 at which the driver's chest portion hits is allowed to be deformed easily, and thereby the impact force to the driver's chest portion by the above-described hitting can be further reduced.

Also, even if the driver's chest portion hits against the rear part of the ring portion 17, this rear part of the ring portion 17 is deformed forward by this hitting and thereby the impact energy is absorbed properly as shown by a two-dotted broken line in FIG. 5. Thus, the impact to the driver's chest portion can be surely reduced along with the above-described hitting of the part of the bag portion 26.

As described above, the timing of the forward deformation of the rear part of the ring portion 17 is after the rear-side part 52b has opened. Namely, the rear-side part 52b has already reached the opposite side of the ring portion 17 to the location of the driver's head when the rear part of the ring portion 17 is deformed. Thus, the rear-side part 52b can be surely prevented from interfering with the rear part of the ring portion 17 when it opens. As a consequence, the impact to the driver's chest portion or the like can be reduced properly, and the rear-side part 52b can be prevented from getting broken by such interference, so a situation where its broken parts would be scattered toward the driver D can be avoided. Thus, the protection of the driver D can be improved.

Embodiment 2

Figure 8:
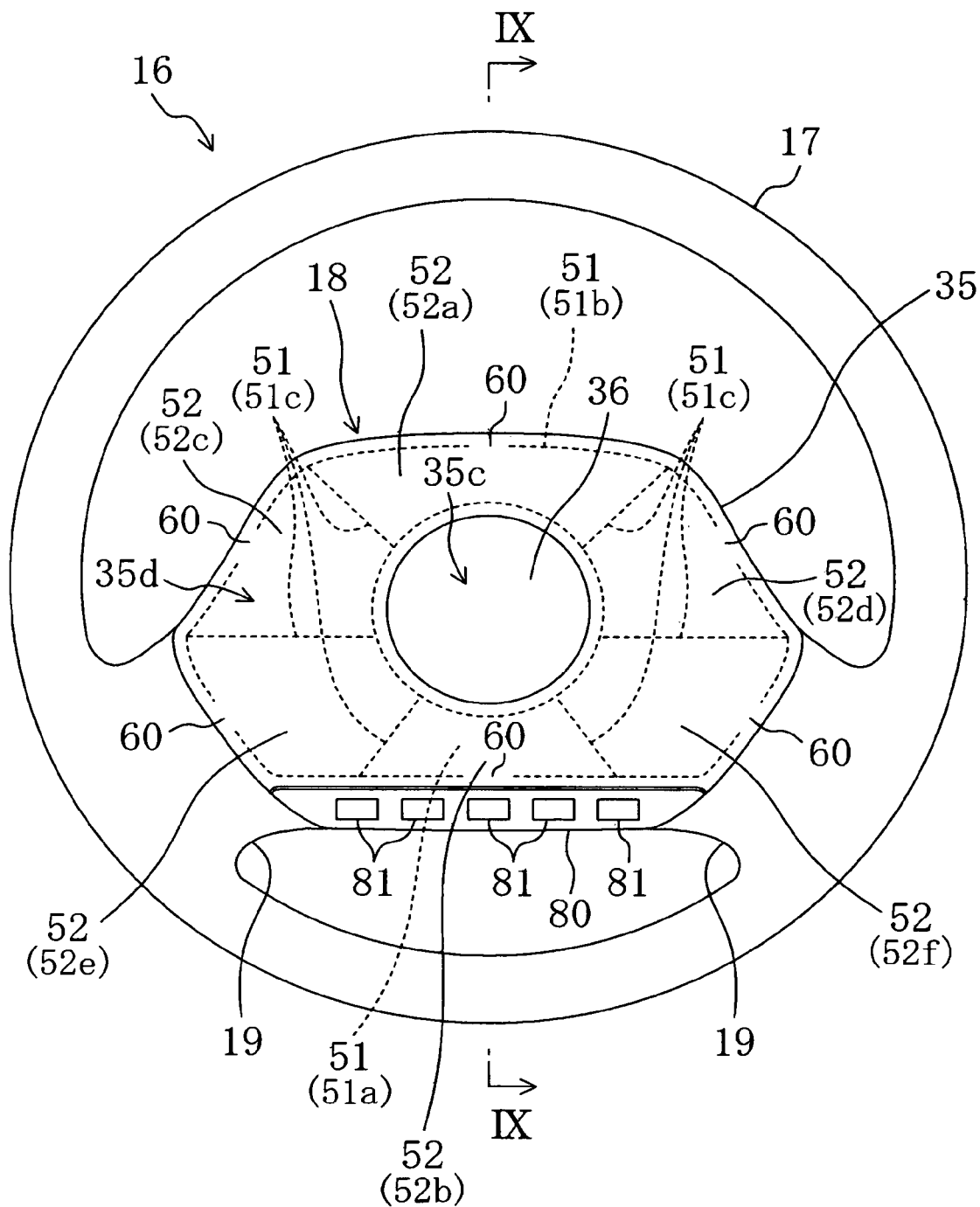
FIG. 8 is a view, which corresponds to FIG. 3, showing an embodiment 2 of the present invention.
Figure 9:
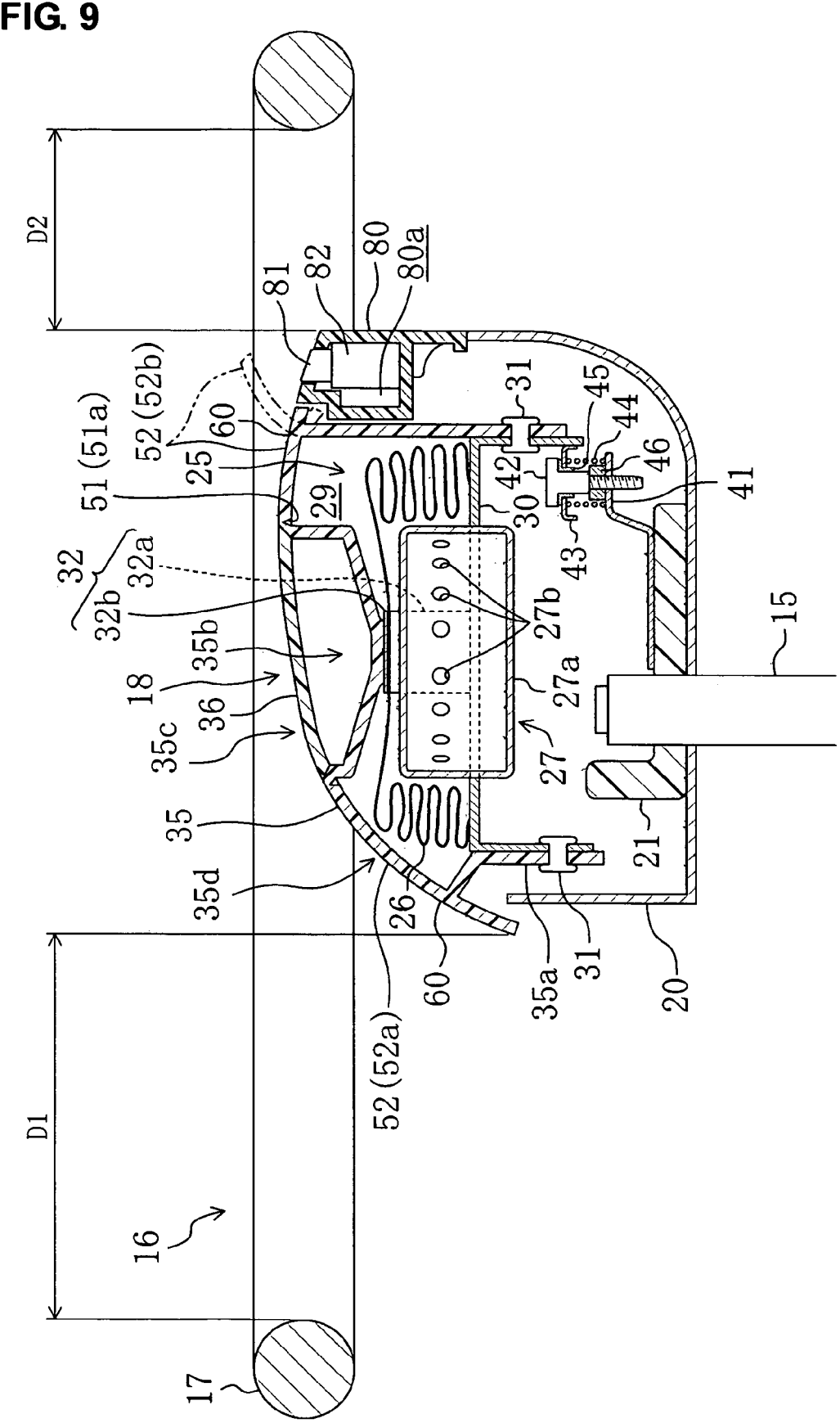
FIG. 9 is a sectional view taken along line IX-IX of FIG. 8.

FIGS. 8 and 9 show an embodiment 2 of the present invention (the same parts as those in FIGS. 3 and 4 are denoted by the same reference characters, and their detailed descriptions are omitted). Herein, there are provided a plurality of operational switches 81 for an onboard device, such as the audio device 9, a navigation device and so on, near a rear-side end of the pad portion 18 behind the rear-side part 52b (the number of the switches are not limited to five, as shown in FIG. 8, but any number may be applied including one).

In the present embodiment, an ornamental member 80 is provided at the rear part of the pad portion 18 (outside the support portion 35a of the cover member 35) to be fixed to the column 20. Inside the ornamental member 80 there is provided a switch housing 80a to accommodate a switch unit 82 containing the plural operational switches 81. These operational switches 81 are exposed toward the driver D out of openings formed at the ornamental member 80. The switch unit 82 is configured such as the switches are turned on by pushing the switches 81, whose detailed descriptions are omitted here.

Herein, like the above-described embodiment 1, the pad portion 18 is provided relative to the ring portion 17 such that the distance D1 between the front-side end of the cover member 35 of the pad portion 18 and the front-side end of the inner peripheral portion of the ring portion 17 is greater than the distance D2 between the rear-side end of the cover member 35 of the pad portion 17 and the rear-side end of the inner peripheral portion of the ring portion 17. Also, the rear-side part 52b is configured to rotate around the hinge portion 60 provided at the rear-side end of the cover member 35 and open rearward. In this embodiment, the hinge portion 60 of the rear-side part 52b is not located on the opposite side to the location of the driver's head relative to the ring portion 17 unlike the embodiment 1. Also, since there is provided the ornamental member 80 in the present embodiment, the rear-side part 52b does not get through the space formed between the pad portion 18 and the ring portion 17 and does not reach the opposite side of the ring portion 17 to the location of the driver's head.

According to the present embodiment, however, since the longitudinal length of the rear-side part 52b is shorter than that of the rear-side part 52b of the embodiment 1 because of the disposition of the operational switches 81, the rear-side part 52b opens without contacting the rear apart of the ring portion 17 as shown by a two-dotted broken line in FIG. 9. Thus, the rear-side part 52b that has opened covers the ornamental member 80 and does not cover the space formed between the pad portion 18 and the ring portion 17.

Herein, according to the present invention, since the bag portion 26 has the larger configuration than the ring portion 17 like the embodiment 1, the driver's chest portion can surely hits against the rear-side part of the outer peripheral portion of the pad portion 26 before hitting against the ring portion 17.

Accordingly, according to the embodiment 2, the space formed between the pad portion 18 and the ring portion 17 is not coved by the rear-side part 52b that has opened like the embodiment 1 and there is nothing that prevents the part of the bag portion 26 located corresponding to the above-described space from moving toward the opposite side to the driver's head location unlike the embodiment 1. Thereby, the deformable amount of the hitting part of the bag portion 26 against the driver's chest portion can be increased compared to the embodiment 1, so the impact to the driver's chest portion can be reduced further properly.

Embodiment 3

Figure 10:
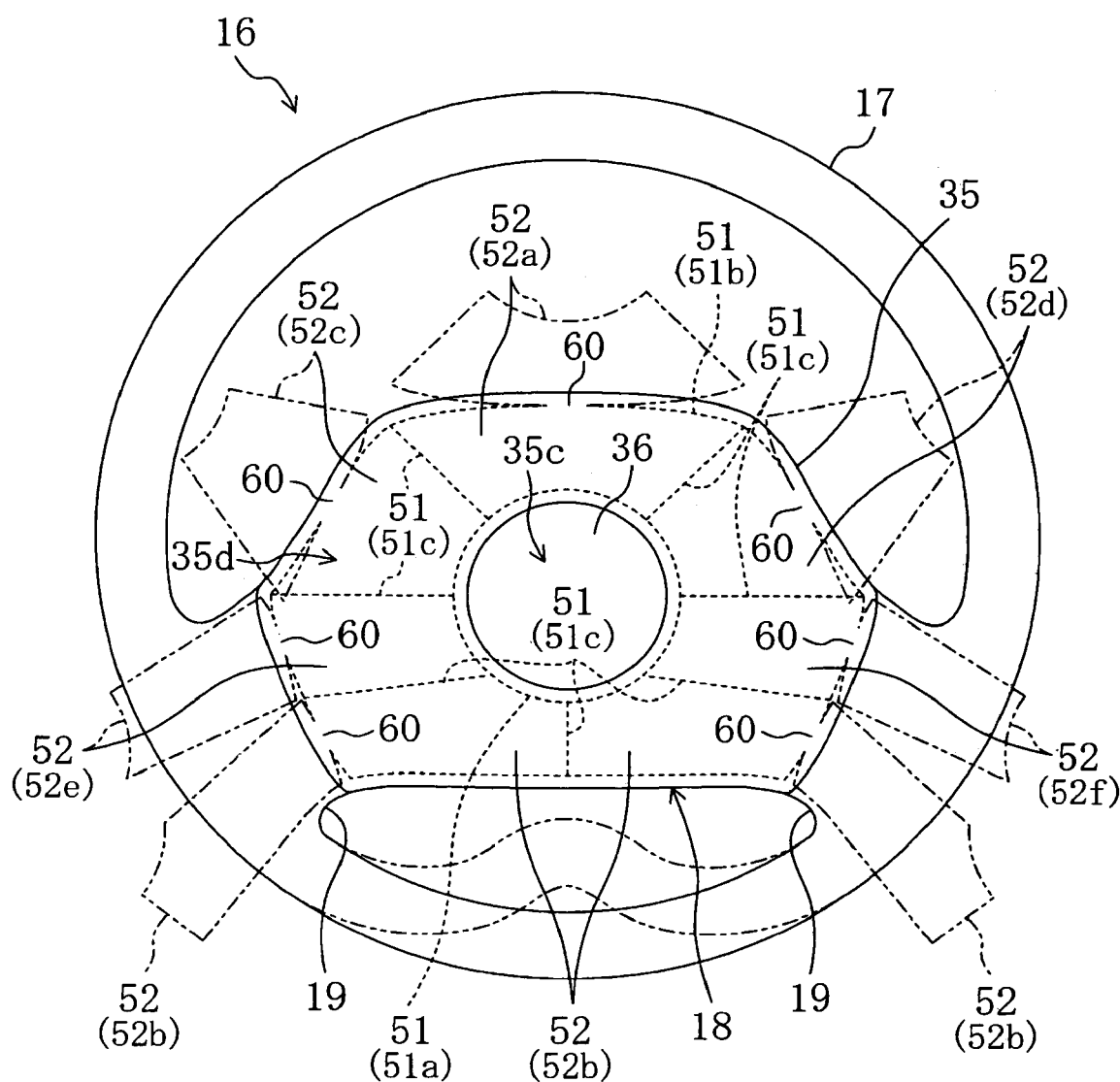
FIG. 10 is a view, which corresponds to FIG. 3, showing an embodiment 3 of the present invention.

FIG. 10 shows an embodiment 3, in which an open direction of the rear-part 52b is different from the embodiments 1 and 2 and other constitutions are the same as those of the embodiment 1.

Namely, in the present embodiment, the number of the middle tear grooves 51c increases by one compared to the embodiment 1 and 2 and thereby there are seven parts 52 of the open cover portion in total. At the rear-half part of the open cover portion, the number of the parts 52 increases by one and thereby there are four parts 52. And, two rear-side part 52b are disposed laterally behind the cover central portion 35c.

The hinge portion 60 of the left rear-side part 52b is located near a left end of the cover member 35 of the pad portion 18, namely, near a connecting portion of the pad portion 18 to the left spoke portion 19. The hinge portion 60 of the right rear-side part 52b is located near a right end of the cover member 35 of the pad portion 18, namely, near a connecting portion of the pad portion 18 to the right spoke portion 19. And, as shown by two-dotted broken lines in FIG. 10, the left rear-side part 52b opens to the left around its hinge portion 60, and the right rear-side part 52b opens to the right around its hinge portion 60. Thus, the two rear-side parts 52b, 52b open over the spoke portion 19 respectively. Namely, the rear-side parts 52b open without contacting the rear part of the ring portion 17 and thus the rear-side parts 52b that has opened do not cover the space formed between the pad portion 18 and the ring portion 17. The right and left parts 52e and 52f open over the spoke portions 19 respectively, like the embodiments 1 and 2.

Accordingly, according to the embodiment 3, the space formed between the pad portion 18 and the ring portion 17 is not coved by the rear-side parts 52b that has opened like the embodiments 1 and 2 and there is nothing that prevents the part of the bag portion 26 located corresponding to the above-described space from moving toward the opposite side to the driver's head location like the embodiment 2. Thereby, the impact to the driver's chest portion can be reduced further properly.

Further, since the bag portion 26 has the larger configuration than the ring portion 17, the driver's chest portion can surely hits against the rear-side part of the outer peripheral portion of the pad portion 26 before hitting against the ring portion 17. Then, even if the driver's chest portion hits against the rear part of the ring portion 17, the rear part of the ring portion 17 is deformed forward as shown by a two-dotted broken line in FIG. 10. Thereby, the impact to the driver's chest portion can be reduced properly. Further, since the two rear-side parts 52b open laterally, not rearward, any interference of the ring portion 17 deformed with these rear-side parts 52b that has opened can be avoided. The above-described reduction of the impact by the deformation of the ring portion 17 can be more properly attained. Also, since the rear-side parts 52b are supported between the pad portion 18 and the spoke portions 19, the situation where their broken parts would be scattered toward the driver can be avoided surely.

Herein, the rear-side part 52b may be comprised of one part instead of two parts. In this case, the hinge 60 of the one rear-side part 52b is located at either one side of the cover member 52 and thereby the part 52b is configure to open laterally toward one side.

Also, there may be provided one or plural operational switches for the onboard device in the present embodiment as well.

Any rear-side part 52b of the present invention may be applied, by not being limited to those described in the above-described embodiments 1-3, as long as the rear-side part 52*b* is configured so as to be supported partially at the pad portion 18 and open without contacting the rear-side part of the ring portion 17 and thereby the part 52*b* that has opened does not cover the space formed between the pad portion 18 and the ring portion 17. For example, the hinge portion 60 of the rear-side part 52*b* is located at the boundary between the cover central portion 35*c* and the rear-side part 52*b* (namely, the inside tear groove 51*a* is configured such that part thereof intermits and the intermittent part is comprised of the hinge portion 60), the rear-side part 52*b* is configured to open forward around the hinge portion 60.

Also, the steering wheel 16 may be comprised of four spoke portions 16 instead of the steering wheel with the two spoke portions 16 of the above-described embodiments.

What is claimed is:

1. A steering wheel equipped with an airbag device, comprising:
   a ring portion to be gripped by a driver;
   a pad portion coupled to said ring portion via a spoke portion and located at a central portion of the ring portion; and
   an airbag device disposed in said pad portion,
   wherein said airbag device comprises a bag portion that is accommodated in said pad portion substantially in a ring shape, when viewed from the driver, and operative to inflate toward a driver's head at a vehicle frontal crash, part of said pad portion located on a side of the driver includes a cover member that comprises a fixed cover portion that is located at a central portion of the bag portion and does not open at inflation of the bag portion and an open cover portion that is disposed around the fixed cover portion and opens outside so as to form a substantially-ring-shaped opening portion through which the bag portion inflates toward the driver's head at the inflation of the bag portion, said ring portion is disposed to be inclined relative to a vertical direction with an inclined angle between 40 and 90 degrees, when viewed from a vehicle width direction, said bag portion has a larger configuration than said ring portion so as to cover over the ring portion, inflating outwardly beyond an outer peripheral portion of the ring portion when the inflation is completed in such a manner that a chest portion of the driver hits against a rear-side part of an outer peripheral portion of the inflated bag portion before hitting against the ring portion, and
   the bag portion is configured to inflate in such a manner that the bag portion gets out of the opening portion formed by opening of the open cover portion and expands with a hollow portion thereof which is formed at a central portion of the bag portion above the fixed cover portion and shrinks gradually according to an expansion of the bag portion, and that when the bag portion is substantially fully inflated, an inner peripheral surface of the shrinking hollow portion contacts each other with a substantial elimination of the hollow portion so as to make a central portion of a top end face of the inflated bag portion and the fixed cover portion of the cover member be coupled via the inner peripheral surface of the hollow portion, whereby a forward movement of the bag portion which is caused by pushing of the chest portion of the driver hitting against the rear-side part of the outer peripheral portion of the inflated bag portion can be suppressed.

2. The steering wheel equipped with an airbag device of claim 1, wherein a front-side part of said open cover portion that is located forward relative to the fixed cover portion in a vehicle traveling direction is configured so as to open forward around a hinge portion that is located near a front-side end of the cover member on an opposite side to a location of a drivers head relative to said ring portion.

3. The steering wheel equipped with an airbag device of claim 2, wherein a meter is provided at an instrument panel in front of said ring portion, and part of said cover member that extends forward in the vehicle traveling direction from a front-side boundary of the fixed cover portion and the front-side part of the open cover portion to the front-side end of the cover member is configured so as to be inclined toward the opposite side to the location of the driver's head, whereby the driver can have a view of the meter through a front- side space formed between the pad portion and the ring portion.

4. The steering wheel equipped with an airbag device of claim 1, wherein an outer peripheral portion of said fixed cover portion that is located on a side of a location of a driver's head is configured so as to be disposed substantially on the same level as an inner peripheral portion of said open cover portion or to project toward the driver's head.

5. The steering wheel equipped with an airbag device of claim 1, wherein said fixed cover portion is of a substantially circular shape when viewed from the driver's-head side.

6. The steering wheel equipped with an airbag device of claim 1, wherein said pad portion is provided relative to said ring portion in a vehicle traveling direction such that a distance between a front-side end of said cover member of the pad portion and a front-side end of an inner peripheral portion of the ring portion is greater than a distance between a rear-side end of the cover member of the pad portion and a rear-side end of the inner peripheral portion of the ring portion, a rear-side part of the ring portion is configured to be deformable by hitting of a driver's body moving forward at the vehicle frontal crash, said open cover portion is comprised of a plurality of parts that open separately at the inflation of the bag portion, and a rear-side part of said open cover portion that is located rearward relative to the fixed cover portion is configured so as to open laterally around a hinge portion that is located near a side end of the cover member of the pad portion.

7. The steering wheel equipped with an airbag device of claim 6, wherein said hinge portion of the rear-side part of the open cover portion is located near a connecting portion of the pad portion to the spoke portion, and said rear-side part of the open cover portion is configured to open over the spoke portion.

8. The steering wheel equipped with an airbag device of claim 1, wherein said pad portion is provided relative to said ring portion in a vehicle traveling direction such that a distance between a front-side end of said cover member of the pad portion and a front-side end of an inner peripheral portion of the ring portion is greater than a distance between a rear-side end of the cover member of the pad portion and a rear-side end of the inner peripheral portion of the ring portion, a rear-side part of the ring portion is configured to be deformable by hitting of a driver's body moving forward at the vehicle frontal crash, said open cover portion is comprised of a plurality of parts that open separately at the inflation of the bag portion, and a rear-side part of said open cover portion that is located rearward relative to the fixed cover portion is configured so as to open rearward around a hinge portion that is located near a rear end of the cover member of the pad portion, whereby the rear-side part of the cover member can open and move forward getting through a space formed between the pad portion and the ring portion.

9. The steering wheel equipped with an airbag device of claim 1, wherein said pad portion is provided relative to said ring portion in a vehicle traveling direction such that a distance between a front-side end of said cover member of the pad portion and a front-side end of an inner peripheral portion of the ring portion is greater than a distance between a rear-side end of the cover member of the pad portion and a rear-side end of the inner peripheral portion of the ring portion, said open cover portion is comprised of a plurality of parts that open separately at the inflation of the bag portion, and a rear-side part of said open cover portion that is located rearward relative to the fixed cover portion is configured so as to be supported partially at the pad portion and open without contacting a rear-side part of the ring portion, whereby the rear-side part of the open cover portion that has opened does not cover a space formed between the pad portion and the ring portion.

10. The steering wheel equipped with an airbag device of claim 9, wherein a portion of said rear-side part of said open cover portion that is supported at the pad portion is a hinge portion that is provided near a side end of the cover member of the pad portion, and the rear-side part of the open cover portion is configured so as to open laterally around the hinge portion.

11. The steering wheel equipped with an airbag device of claim 1, wherein said fixed cover portion is positioned in such a manner that a location thereof substantially overlaps with said ring portion, when viewed from the vehicle width direction.

12. A steering wheel equipped with an airbag device, comprising:
   a ring portion to be griped by a driver;
   a pad portion coupled to said ring portion via a spoke portion and located at a central portion of the ring portion; and
   an airbag device disposed in said pad portion,
   wherein said airbag device comprises a bag portion that is accommodated in said pad portion substantially in a ring shape, when viewed from the driver, and operative to inflate toward a driver's head at a vehicle frontal crash, part of said pad portion located on a side of the driver includes a cover member that comprises a fixed cover portion that is located at a central portion of the bag portion and does not open at inflation of the bag portion and an open cover portion that is disposed around the fixed cover portion and opens outside so as to form a substantially-ring-shaped opening portion through which the bag portion inflates toward the driver's head at the inflation of the bag portion, said ring portion is disposed to be inclined relative to a vertical direction with an inclined angle between 40 and 90 degrees, when viewed from a vehicle width direction, and said bag portion has a larger configuration than said ring portion so as to cover over the ring portion when the inflation is completed,
   said pad portion is provided relative to said ring portion in a vehicle traveling direction such that a distance between a front-side end of said cover member of the pad portion and a front-side end of an inner peripheral portion of the ring portion is greater than a distance between a rear-side end of the cover member of the pad portion and a rear-side end of the inner peripheral portion of the ring portion, said open cover portion is comprised of a plurality of parts that open separately at the inflation of the hag portion, and a rear-side part of said open cover portion that is located rearward relative to the fixed cover portion is configured so as to be supported partially at the pad portion and open without contacting a rear-side part of the ring portion, whereby the rear-side part of the open cover portion that has opened does not cover a space formed between the pad portion and the ring portion, and
   an operational switch for an onboard device is provided near a rear-side end of said pad portion behind said rear-side part of the open cover portion.

* * * * *